US008254764B2

United States Patent
Kanemaru et al.

(10) Patent No.: US 8,254,764 B2
(45) Date of Patent: Aug. 28, 2012

(54) RECORDING APPARATUS, IMAGE REPRODUCING APPARATUS, AND SPECIAL REPRODUCTION METHOD THEREFOR

(75) Inventors: Takashi Kanemaru, Yokohama (JP); Sadao Tsuruga, Yokohama (JP); Yuji Yamamoto, Yokohama (JP); Mitsunobu Watanabe, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1170 days.

(21) Appl. No.: 12/077,501

(22) Filed: Mar. 18, 2008

(65) Prior Publication Data

US 2008/0232782 A1    Sep. 25, 2008

(30) Foreign Application Priority Data

Mar. 19, 2007 (JP) .................................. 2007-070801

(51) Int. Cl.
*H04N 5/935* (2006.01)
(52) U.S. Cl. ........................................ 386/314; 386/224
(58) Field of Classification Search .................. 386/124, 386/314
See application file for complete search history.

(56) References Cited

U.S. PATENT DOCUMENTS

| 6,011,897 | A  | * | 1/2000  | Koyama et al. ............... 386/241 |
| 6,445,877 | B1 | * | 9/2002  | Okada et al. .................. 386/248 |
| 6,625,627 | B2 | * | 9/2003  | Haneda ............................... 1/1 |
| 2002/0131761 | A1 |  | 9/2002 | Kawasaki et al. |
| 2002/0135607 | A1 |  | 9/2002 | Kato et al. |
| 2004/0146277 | A1 | * | 7/2004 | Nishitani ....................... 386/68 |
| 2005/0157528 | A1 |  | 7/2005 | Kanai et al. |
| 2006/0233083 | A1 | * | 10/2006 | Tsumagari et al. ........ 369/59.25 |
| 2007/0154180 | A1 | * | 7/2007 | Kim et al. ....................... 386/95 |

FOREIGN PATENT DOCUMENTS

| JP | 2002-158972 A | 5/2002 |
| JP | 2002-290917 A | 10/2002 |
| JP | 2003-257157 A | 9/2003 |
| JP | 2004-104258 A | 4/2004 |
| JP | 2005-197839    | 7/2005 |
| JP | 2006-245744 A | 9/2006 |

\* cited by examiner

*Primary Examiner* — Haresh N Patel
*Assistant Examiner* — Dao Ho
(74) *Attorney, Agent, or Firm* — Kilpatrick Townsend & Stockton LLP

(57) ABSTRACT

According to the present invention, there is provided an image reproducing apparatus for reproducing a digital broadcast based on the MPEG standard. When performing special reproduction by use of access-unit management information that is used to manage access units, the image reproducing apparatus reads ahead the access-unit management information and compares time stamps. As a result of the comparison, if it is judged that the absence of a piece of the access-unit management information exists, the special reproduction is then performed by use of simple information that is used to manage a stream.

This makes it possible to continuously perform the special reproduction even if it becomes impossible to utilize the access-unit management information.

5 Claims, 7 Drawing Sheets

RECORDING APPARATUS, IMAGE REPRODUCING APPARATUS, AND SPECIAL REPRODUCTION METHOD THEREFOR

CLAIMS OF PRIORITY

The present application claims priority from Japanese application serial no. JP2007-070801, filed on Mar. 19, 2007, the content of which is hereby incorporated by reference into this application.

BACKGROUND OF THE INVENTION

The technical field of the present invention relates to apparatuses for reproducing a recorded image and a special reproduction method therefor.

In recent years, in the television broadcast field, the conventional analog broadcasting is shifting to digital broadcasting.

An object of the invention disclosed in JP-A-2003-257157 is to provide information recording apparatus that is capable of recording broadcast information so that the broadcast information to be reproduced can be correctly identified to reproduce it with increased convenience of the reproduction of the broadcast information. Problem solving means disclosed in JP-A-2003-257157 is as follows: performing time management at the time of reproduction on an allocation unit ALU basis by use of the receiving times of the first packet and the last packet of an allocation unit ALU that includes a plurality of packets included in the broadcast information; and on the basis of display time information of an I picture included in the packet or on the basis of receiving time information of the I picture, performing the time management in question even on an access unit basis including the I picture.

An object of the invention disclosed in JP-A-2005-197839 is to easily enable special reproduction by: at the time of recording a transport stream, inserting positional information of an I picture into the transport stream according to specified rules; at the time of the special reproduction, quickly reading out the positional information of the I picture according to the rules; and detecting the I picture on the basis of the positional information. Problem solving means disclosed in JP-A-2005-197839 is as follows: at the time of recording a transport stream on a recording medium, analyzing the picture type of MPEG to obtain positional information of an I picture; describing the obtained positional information of the anterior I picture in a format of a transport stream packet to make it an I reference packet; periodically (at intervals of a fixed number of packets) inserting the I reference packet into a transport stream to record the I reference packet; and at the time of the special reproduction, obtaining the inserted I reference packet and extracting a transport stream packet of the I picture on the basis of the I reference packet to perform the special reproduction.

In the field of the digital broadcasting, it is possible to use an image compression technology in which video data is compressed to be transmitted. As a practical standard of the image compression technology used in the digital broadcast, the MPEG technology has achieved widespread use.

In the case of the digital television broadcasting that adopts the MPEG technology, data is time-division multiplexed by use of a relatively short transmission unit (transport packet); the time-division multiplexed data is then transmitted from a broadcasting station to a receiver as a MPEG2-TS (transport stream).

According to the MPEG2 standard, audio/visual data (AV data) is encoded; the encoded data is then transmitted as an MPEG2-TS that is constituted of a plurality of transport packets.

The MPEG2-TS which has been received by the receiver is decoded by a decoder. The decoded MPEG2-TS is then output to a display screen and an audio output device as AV data.

In addition, the received MPEG2-TS can also be temporarily stored in a storage medium using a disk, such as a HDD (hard disk drive), an optical disk, a magneto-optical disk, and a magnetic disk. The received MPEG2-TS can also be temporarily written to a recording device or medium that uses a semiconductor (for example, a card-like storage medium). When a viewer wants to view the stored MPEG2-TS, the viewer can reproduce and view the MPEG2-TS through the operation by the viewer. In this case, at the time of the reproduction, the user can perform the special reproduction such as fast forward reproduction, rewind reproduction, and jump reproduction. A recording technology, such as a method for recording MPEG2-TSs on a recording device or medium, is disclosed in, for example, JP-A-2003-257157.

Incidentally, when the MPEG2 is used to encode an image, the MPEG2 has not only a function of directly encoding all frames of image data but also a function of referring to data of an adjacent frame that has already been encoded so that only the difference from that data is encoded. In general, a moving image has a high correlation between frames that are adjacent to each other. Therefore, it is expected that by encoding only the difference between frames adjacent to each other, it is possible to drastically decrease the amount of information created as a result of the encoding.

According to the MPEG standard, frames (pictures) are classified into three picture types: an I (Intra) picture; a P (Predictive) picture; and a B (Bidirectionally predictive) picture.

The I picture is a frame (picture) that keeps independence among GOP (Group of Pictures) and that is encoded without reference to data of other frames (pictures). On the other hand, the P picture is a frame (picture) that is encoded with reference to a past I picture or a past P picture. The B picture is a frame (picture) that is encoded with reference to past and future I pictures or past and future P pictures. Encoding efficiency becomes higher in the order of I, P, and B. Accordingly, the encoding efficiency of the I picture is the lowest. However, the I picture has a feature that it is possible to reconstruct an image by only one frame (picture).

Therefore, when the special reproduction such as fast forwarding is performed, only an I picture is extracted to reconstruct an image. JP-A-2005-197839 discloses a method in which positional information of an I picture is written to a recording medium such as a HDD, and then a transport stream is reproduced by reading out the positional information.

Here, an example of a data structure used when AV stream contents including video data and audio data is recorded on a recording medium will be described with reference to FIGS. 7 to 9.

FIG. 7 is a schematic diagram illustrating an example of a TTS (Time Stamped Transport Stream) packet.

FIG. 8 is a schematic diagram illustrating the relationship between TTS packets and AUs in an AV stream recorded on a recording medium.

FIG. 9 is a schematic diagram illustrating the relationship between AUs, I pictures, and accompanying information thereof, which are included in an AV stream recorded on a recording medium.

As shown in FIG. 7, to the top of a transport packet (TS packet) having a length of 188 bytes based on the MPEG standard, time information (for example, the time at which a receiver receives the transport packet) having a length of 4 bytes is added. Hereinafter, the time information is referred to as "ATS: Arrival Time Stamp." The transport packet with the time stamp is then written to a recording medium such as a HDD as a TTS (Time Stamped Transport Stream) packet having a length of 192 bytes. The ATS, which is the time information, holds time stamp information when the transport packet has arrived. A TS packet based on the MPEG standard is constituted of: a header having a length of 4 bytes, the header being located at the top of the TS packet; and a payload (or an adaptation field) having a length of 184 bytes, the payload following the TS packet. A packet ID (PID) is recorded in the header. The packet ID is used to identify each packet. In addition, the TS packet has a program map table (PMT) that associates a PID with a program as the MPEG standard. The program map table can be used to distinguish between video data and audio data and can also be used when a broadcast program provider identifies a stream.

As shown in FIG. 8, for example, 8192 TTS packets constitute an AU (Allocation Unit). In this case, the size of each AU is 1.5 M bytes.

Among TTS packets included in an AU is a TTS packet in which a payload of a transport packet includes the above-described I picture.

SI (Stream Information) is information used to manage a search access unit at the time of the reproduction of an AV stream that is recorded on a recording medium on an AU basis. The SI is recorded as a file different from an AU. Information about locations including an I picture and GOP (Group of Picture) are recorded in the SI. In addition, the search access unit at the time of the reproduction is a data unit by which special reproduction can be performed when only the data unit is specified. In order to make it possible to perform the special reproduction, the search access unit includes at least one I picture. A specific example of the search access unit at the time of the reproduction is, for example, GOP that is specified by the above-described MPEG standard.

Also, an AV stream includes contents information that is constituted of video data and audio data.

On the other hand, a file for storing management information of an AU is AUI (Allocation Unit Information). The time at which a first TTS packet of the AU has arrived (for example, the time at which a receiver has received a transport packet) is recorded in the AUI as time stamp information.

FIG. 9 is a diagram illustrating the relationship between AUs, AUI, and SI. The AUI and SI are the time stamp information.

The above-described prior art describes a method in which in order to perform the special reproduction of a MPEG2-TS, positional information of an I picture is recorded on a recording medium in advance, and then the positional information is utilized. To be more specific, the SI file as described above is created, and the SI file is then utilized to achieve the special reproduction of the MPEG2-TS.

Incidentally, the prior art described above does not disclose a method for performing the special reproduction in a case where SI cannot be used. That is because there is also a case where a piece of SI is missing due to a malfunction of an HDD. Usually, SI is optional, and how to deal with it depends on vendors. Therefore, in particular, a case where video data read out from a removable HDD is subjected to the special reproduction presents a problem.

For example, while the special reproduction is performed by use of SI, if the absence of an SI piece is detected within the SI, a malfunction of a display image (for example, a skip) occurs.

SUMMARY OF THE INVENTION

In a special reproduction method of an image reproducing apparatus according to one embodiment of the present invention, while the special reproduction is performed by use of SI, if it is judged that a piece of SI is missing, the special reproduction is performed by use of AUI.

DESCRIPTION OF THE PREFERRED EMBODIMENTS

An embodiment of the present invention will be described with reference to FIG. 1 to FIG. 6 as below.

First of all, a configuration of an image reproducing apparatus according to a first embodiment will be described with reference to FIG. 1.

Figure 1:
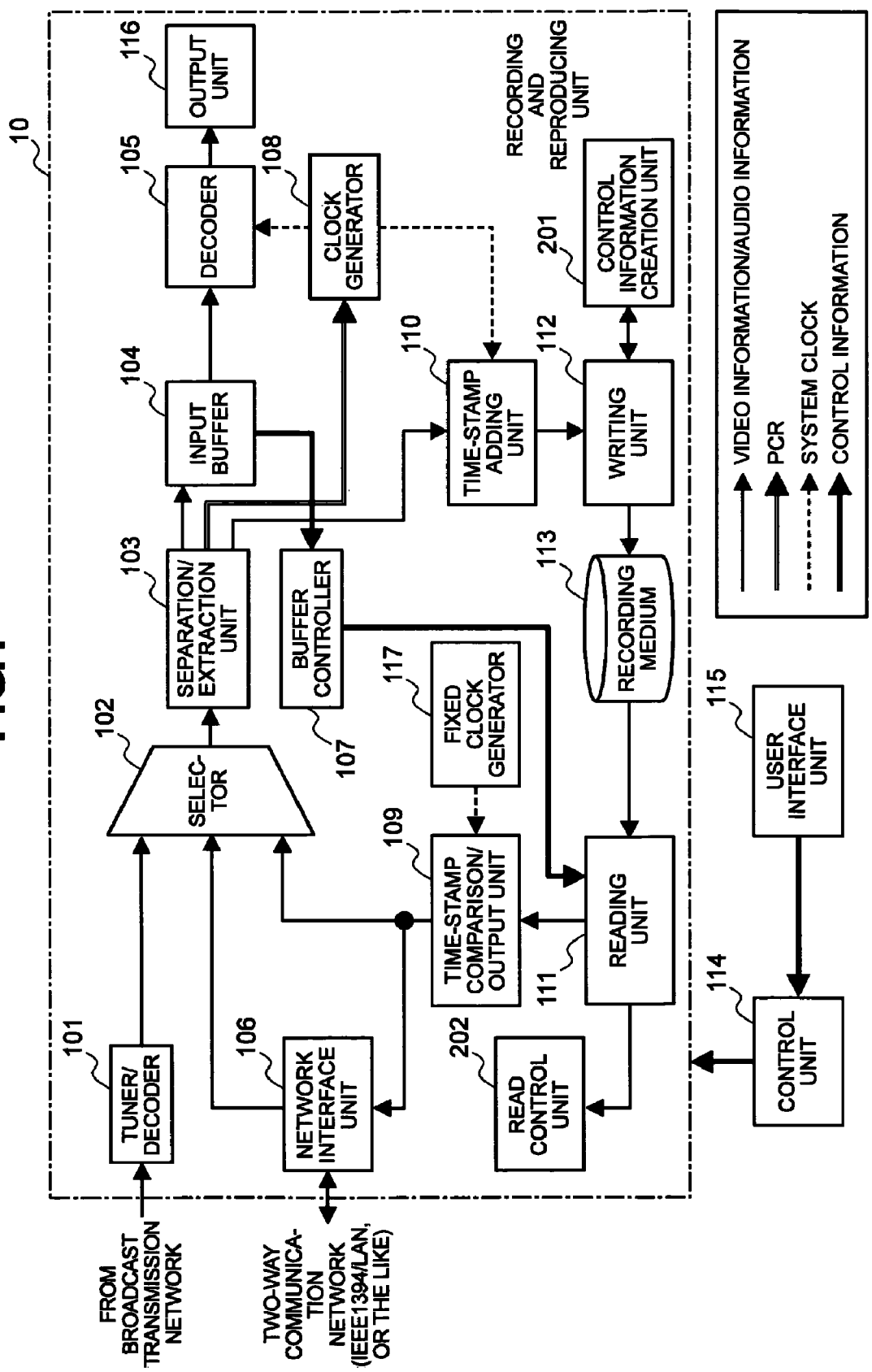
FIG. 1 is a block diagram illustrating as an example a configuration of an image reproducing apparatus according to a first embodiment.

FIG. 1 is a block diagram illustrating an exemplary configuration of the image reproducing apparatus according to the first embodiment.

The image reproducing apparatus according to this embodiment is an image reproducing apparatus that receives a digital broadcast to perform recording and reproduction. In addition, as an example of the image compression technology, a case where a signal which is encoded and multiplexed by the MPEG (Moving Picture Experts Group) method is handled will be described.

Each element of this configuration is described as a hardware element. Moreover, the present invention may also be applied to the transmission of video contents, audio contents, and the like, to a specific user (for example, VOD (Video On Demand) or the like). Those are also generically called "distribution."

The image reproducing apparatus according to this embodiment shown in FIG. 1 includes: a recording and reproducing unit 10; a control unit 114 (for example, a CPU (Central Processing Unit)); and a user interface unit 115 (for example, a keyboard, a mouse (or a remote controller), and a voice input system are included as input devices).

The control unit 114 is connected to each element (including the recording and reproducing unit 10) of the image reproducing apparatus through buses. The control unit 114 controls the operation of the image reproducing apparatus as a whole. In addition, the control unit 114 receives various kinds of instruction signals from a user through, for example, a remote controller of the user interface unit 115. On the basis of the instruction signals, the control unit 114 executes various kinds of processing by controlling each element connected through the buses.

The recording and reproducing unit 10 includes a tuner/decoder 101, a selector 102, a separation/extraction unit 103 (for example, a demultiplexer), an input buffer 104, a decoder 105 (for example, a MPEG decoder), a network interface unit 106, a buffer controller 107, a clock generator 108, a time-stamp comparison/output unit 109, a time-stamp adding unit 110, a reading unit 111, a writing unit 112, a recording medium 113, an output unit 116, a fixed clock generator 117 (for example, a crystal oscillator), a control information producing unit 201, and a read control unit 202.

Here, the recording medium 113 is a medium in which random access can be made. Such a medium includes, for example, a hard disk, a memory, an optical disk, a magneto-optical disk, and a magnetic disk. The output unit 116 includes: a display unit that uses, for example, a CRT (Cathode Ray Tube), a LCD (Liquid Crystal Display), or a PDP (Plasma Display Panel); and an audio output unit such as a speaker. In another case, the output unit 116 is an output terminal or the like for outputting video data/audio data to another display unit.

It should be noted that arrows each representing the flow of information, PCR, and the like are not physically in contact with each other at positions where they cross each other. However, a black dot represents a physical contact point from which such an above-mentioned flow branches.

The tuner/decoder 101 receives a digital broadcast signal from a broadcasting station through a broadcast transmission network such as satellite, terrestrial, and cable broadcasting networks. The tuner/decoder 101 performs channel selection and wave detection processing on a frequency of a physical or virtual channel specified through a user operation unit such as the remote controller of the user interface unit 115 and through the control unit 114. Moreover, the tuner/decoder 101 outputs to the selector 102 an MPEG2-TS (transport stream) that has been subjected to digital demodulation and error correction processing.

The selector 102 performs selection processing to select one output from three inputs thereto according to the control from the control unit 114 and then outputs the output thereof to the separation/extraction unit 103.

The separation/extraction unit 103 separates and extracts, from the inputted MPEG2-TS, transport packets of a channel (broadcast program) specified through the user operation unit such as the remote controller of the user interface unit 115 and through the control unit 114. The separation/extraction unit 103 then outputs to the time-stamp adding unit 110 the transport packets that have been separated and extracted. In addition, the separation/extraction unit 103 separates and extracts a visual/audio PES (Packetized Elementary Stream) or ES (Elementary Stream) from the transport packets of the channel (broadcast program) that has been specified through the user operation unit such as the remote controller of the user interface unit 115 and through the control unit 114. The separation/extraction unit 103 then outputs the separated and extracted PES or ES to the input buffer 104.

Here, the ES refers to each piece of compressed and encoded image/audio data; the PES refers to each image ES or audio ES that is divided appropriately in terms of sizes and then packeted. In addition, the separation/extraction unit 103 extracts PCR (Program Clock Reference) from the transport packets of the channel (broadcast program) that has been specified through the user operation unit such as the remote controller of the user interface unit 115 and through the control unit 114. The separation/extraction unit 103 then outputs the extracted PCR to the clock generator 108.

Moreover, if one broadcast program is constituted of a plurality of programs in a multi-view broadcast, an ES is created for each of the programs with reference to each packet's PID and a program map table (PMT).

The input buffer 104 temporarily stores the visual/audio PES or ES received from the separation/extraction unit 103. The decoder 105 compares a DTS (Decoding Time Stamp)/PTS (Presentation Time Stamp) corresponding to the PES or ES stored in the input buffer 104 with a STC (System Time Clock) count value received from the clock generator 108. Then, the decoder 105 adjusts the decode/display timing and thereby extracts and decodes the visual/audio PES or ES stored in the input buffer 104. The decoded visual/audio data is then output to the output unit 116.

The output unit 116 reproduces the decoded visual/audio data by the display unit/audio output unit or an output device. In another case, the output unit 116 outputs the visual/audio contents data or the like to another display device or the like through the output terminal.

The clock generator 108 uses the PCR to reproduce, for example, a system clock of a receiver whose frequency coincides with a system clock of an encoding/multiplexing unit on the broadcasting station side. The reproduced system clock is output to a STC counter inside the clock generator 108, the time-stamp comparison/output unit 109, the time-stamp adding unit 110, and the like. In addition, a STC count value of the STC counter operating with the reproduced system clock is output to the decoder 105.

The time-stamp adding unit 110 generates a time stamp by use of a counter that operates based on, for example, the system clock reproduced by the clock generator 108 or a crystal oscillator. The time-stamp adding unit 110 then adds the time stamp (ATS shown in FIG. 6) to each transport packet that has been separated and extracted by the separation/extraction unit 103 before outputting each of the transport packets to the writing unit 112.

The writing unit 112 writes onto the recording medium 113 the transport packet to which the time stamp has been added by the time-stamp adding unit 110. As a result, one stream constituted of transport packets to which a plurality of time stamps have been added is written onto the recording medium 113 as one data file or two or more fragmented data files into which the one data file is divided. Here, the one stream also includes video/audio data of a certain channel (in other words, certain broadcast program contents or downloaded contents).

It is to be noted that the time stamp can be said to be information about a temporal position of a transport packet to which the time stamp is added. The above-described time stamp can also be said to be, for example, the time at which a transport packet is input to into the time-stamp adding unit 110 from the separation/extraction unit 103 or the temporal difference from a certain reference transport packet (for example, an immediately preceding transport packet or the first transport packet). Accordingly, as described above, this time stamp differs from a time stamp that is included in the transport packet from the beginning (for example, DTS or PTS).

The buffer controller 107 monitors the number of transport packets that have not yet been processed by the decoder 105, the transport packets being stored in the input buffer 104. The buffer controller 107 controls the start and stop of reading by the reading unit 111 according to the number of the transport packets.

The reading unit 111 is controlled by the buffer controller 107 or the control unit 114. The reading unit 111 sequentially reads out from the recording medium 113 transport packets to which a plurality of time stamps have been added, the transport packets being included in the stream. The reading unit 111 then outputs the transport packets to the time-stamp comparison/output unit 109 and the read control unit 202.

The time-stamp comparison/output unit 109 compares a counter value of a counter, which operates based on the fixed clock generator 117 such as a crystal oscillator with a time stamp of the transport packet read out by the reading unit 111, the time stamp having been added to the transport packet. If the counter value coincides with the time stamp, the time-stamp comparison/output unit 109 deletes (removes) the time stamp from the transport packet and then outputs the transport packet to the selector 102 and the network interface unit 106.

Other devices (a recorder, a display unit, and the like) to/from which data is transmitted/received are connected to the network interface unit 106 through a communication line (an IEEE1394 cable, a LAN cable, wireless communications, or the like). Then, the network interface unit 106 receives the transport packets including video/audio data from which the time stamps have been deleted by the time-stamp comparison/output unit 109. After that, the network interface unit 106 converts the transport packets into data in a format based on each transmission standard and then outputs the data to the other devices which are output destinations through the communication line. In addition, from other devices from which data is received through the communication line, video/audio data is input into the network interface unit 106 in a format based on each transmission standard. After that, the video/audio data is converted into transport packets, which are then output to the selector 102. The number of the network interface units 106 may also be two or more.

Additionally, for an AV stream, the control information producing unit 201 produces control information including AUI and SI.

Next, a special reproduction method of an image reproducing apparatus according to one embodiment of the present invention will be described with reference to FIG. 2 to FIG. 6.

First of all, a data structure of video data of the image reproducing apparatus according to one embodiment of the present invention will be described with reference to FIG. 2.

Figure 2:
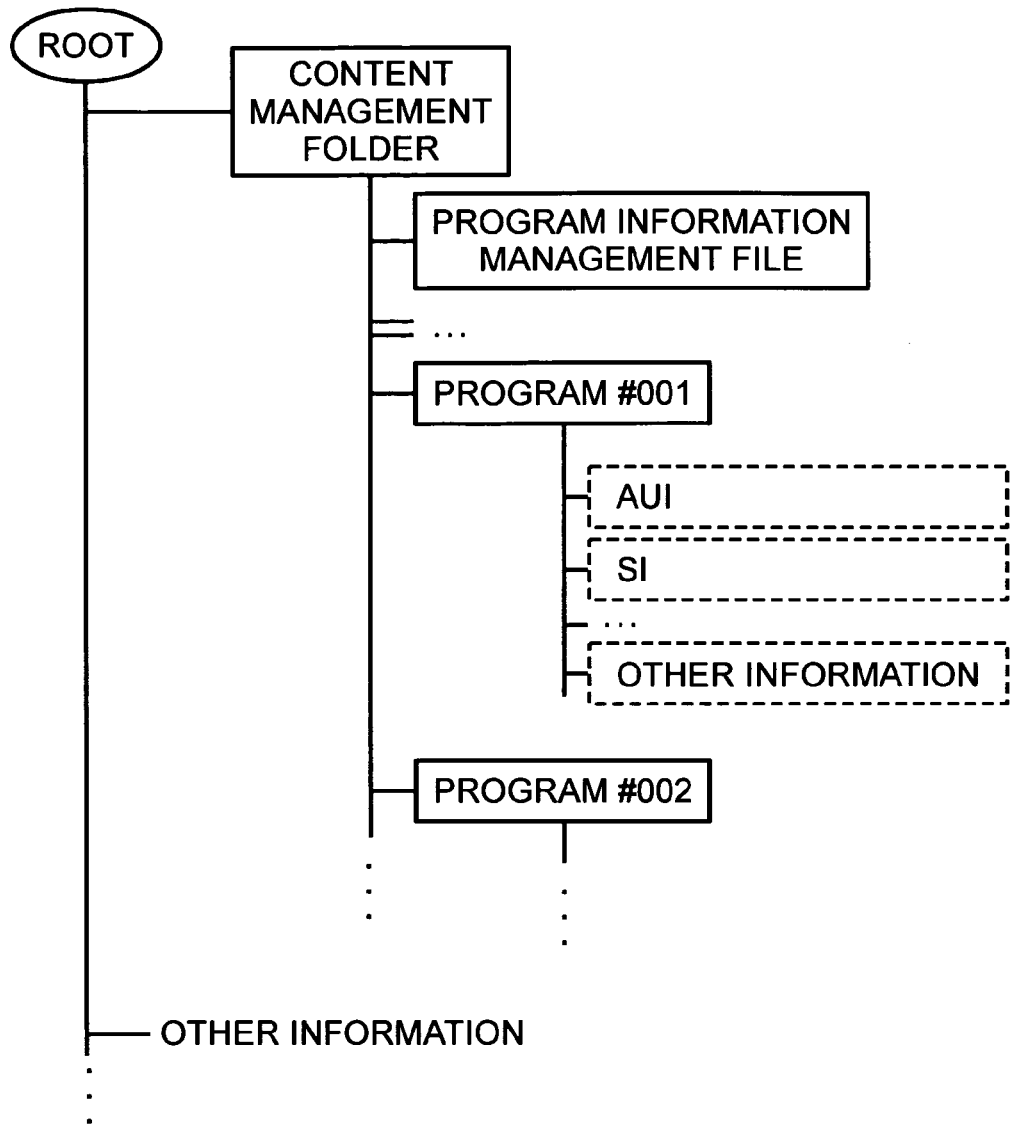
FIG. 2 is a diagram illustrating a data structure of video data of an image reproducing apparatus according to one embodiment of the present invention.

FIG. 2 is a diagram illustrating a data structure of video data of the image reproducing apparatus according to one embodiment of the present invention.

This embodiment is intended for the data structure as shown in FIG. 2. To be more specific, data is managed in a tree structure in which one or more contents management folders are located under a root directory.

A program information management file and files of one or more programs #i (i=1, 2, 3) are located under the contents management folder.

A program information management file 203 includes: reproduction information of a program; and information about a playlist at the time of creating the playlist.

The files of the program #i (i=1, 2, 3) are files each of which stores a data stream of a broadcast program which a user views. The files are associated with SI, AUI, and other information, which are used to manage information about the program #i.

As described above, the SI is information used to manage a search access unit at the time of the reproduction of an AV stream that is recorded on a recording medium on an AU basis. The SI is recorded as a different file from the AU. The SI records information about locations of an I picture and GOP.

As described above, the time at which a first TTS packet of the AU arrives (for example, the time at which a receiver receives a transport packet) is recorded in the AUI as time stamp information.

Next, special reproduction processing of an image reproducing apparatus according to the present invention will be described with reference to FIG. 3 to FIG. 6.

Figure 3:
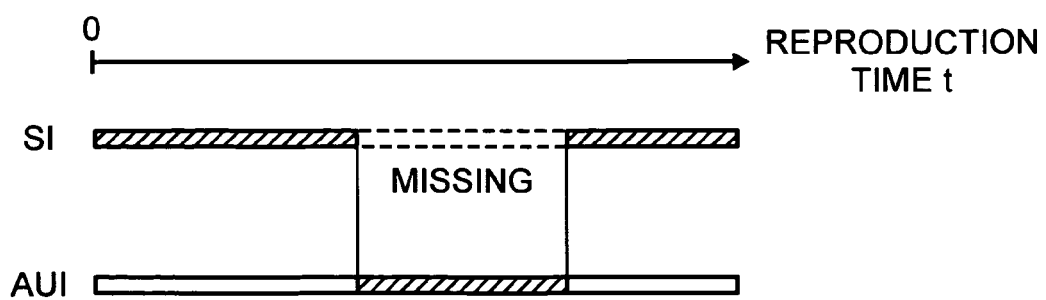
FIG. 3 is a diagram illustrating a concept of special reproduction processing of an image reproducing apparatus according to one embodiment of the present invention.

FIG. 3 is a diagram illustrating a concept of the special reproduction processing of the image reproducing apparatus according to one embodiment of the present invention.

Figure 4:
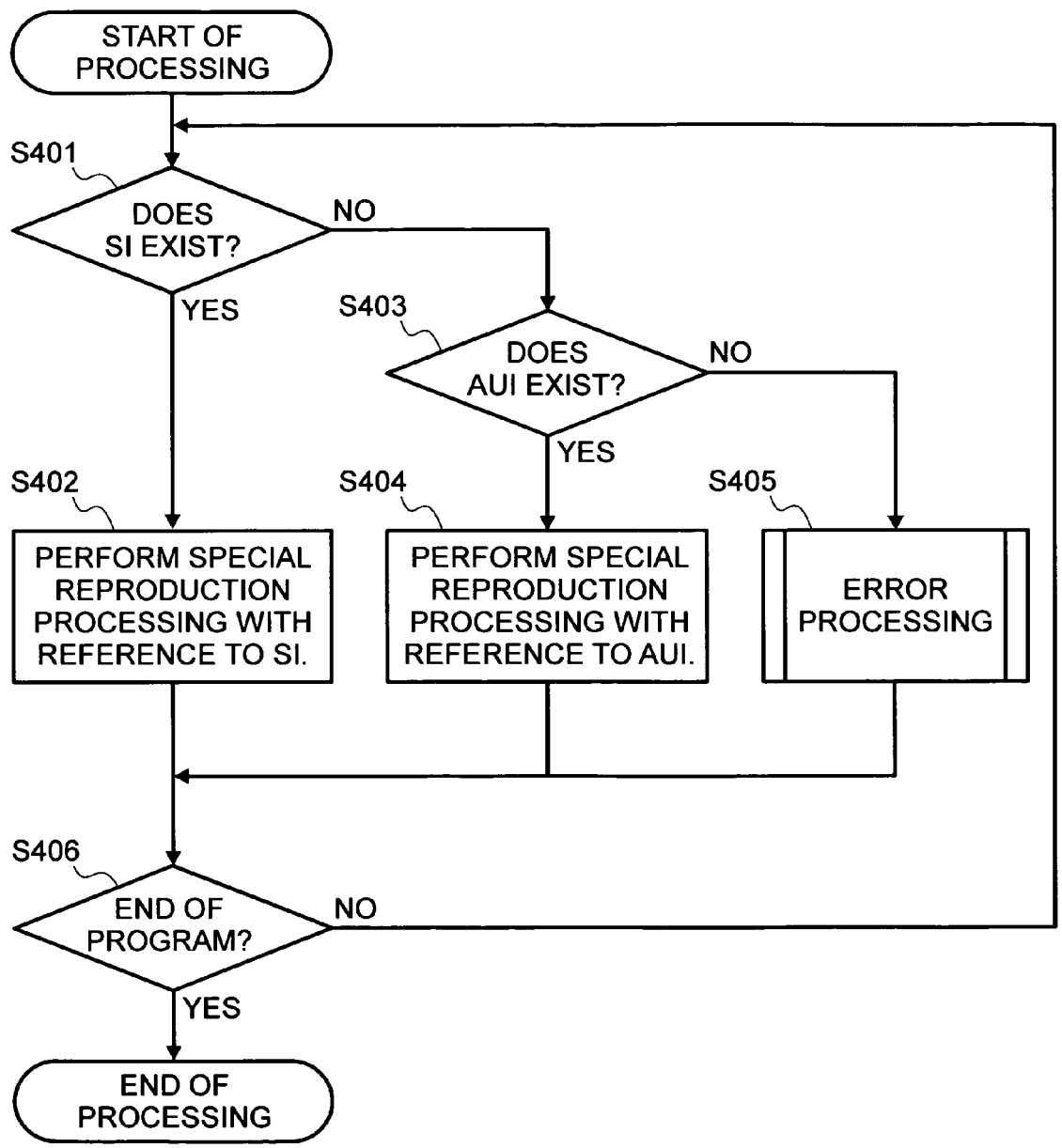
FIG. 4 is a flowchart illustrating the flow of special reproduction processing of an image reproducing apparatus according to one embodiment of the present invention.

FIG. 4 is a flowchart illustrating the flow of the special reproduction processing of the image reproducing apparatus according to one embodiment of the present invention.

Figure 5:
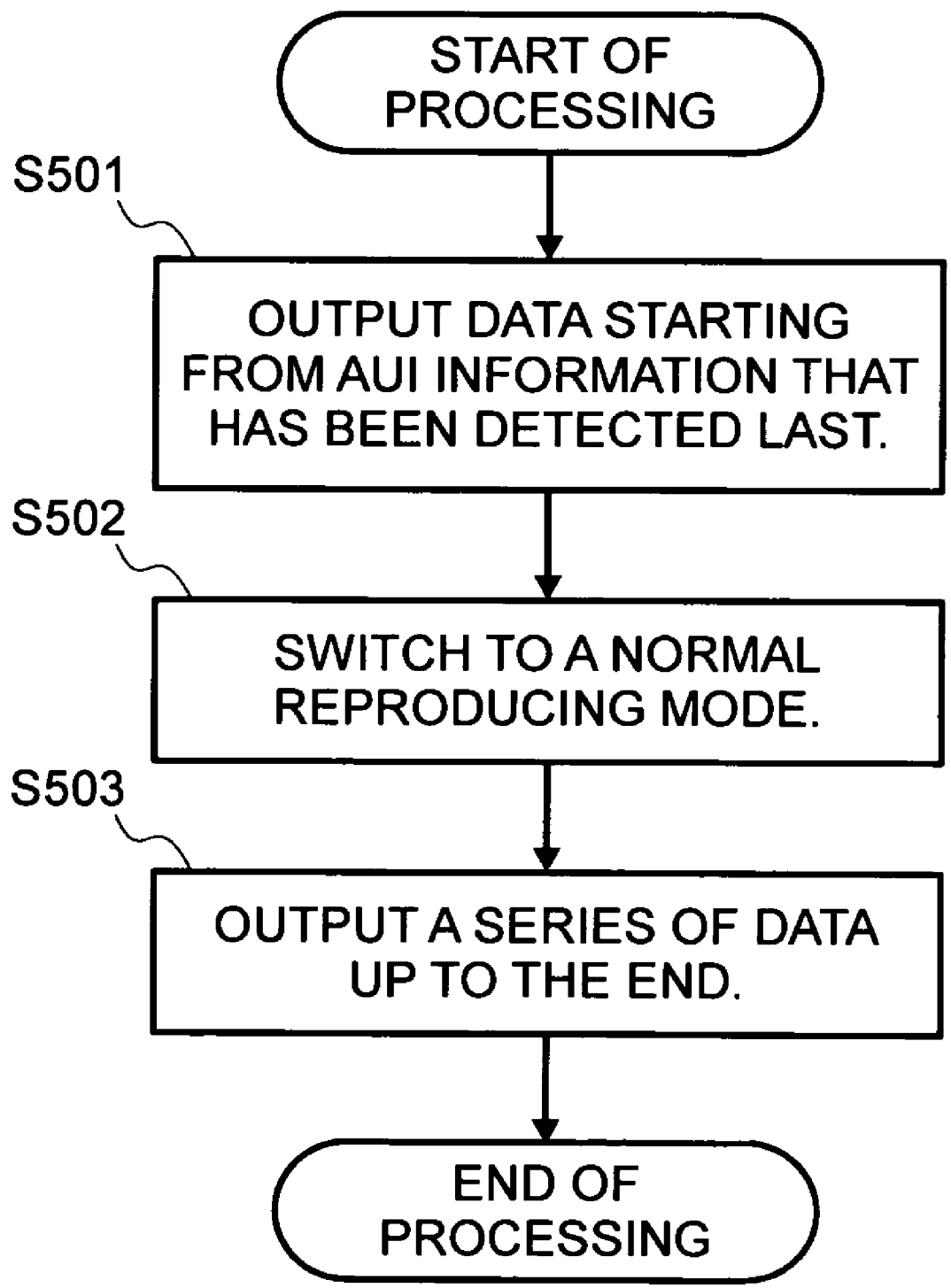
FIG. 5 is a flowchart illustrating error processing of a step S405 of FIG. 4 in detail.

FIG. 5 is a flowchart illustrating error processing of a step S405 of FIG. 4 in detail.

Figure 6:
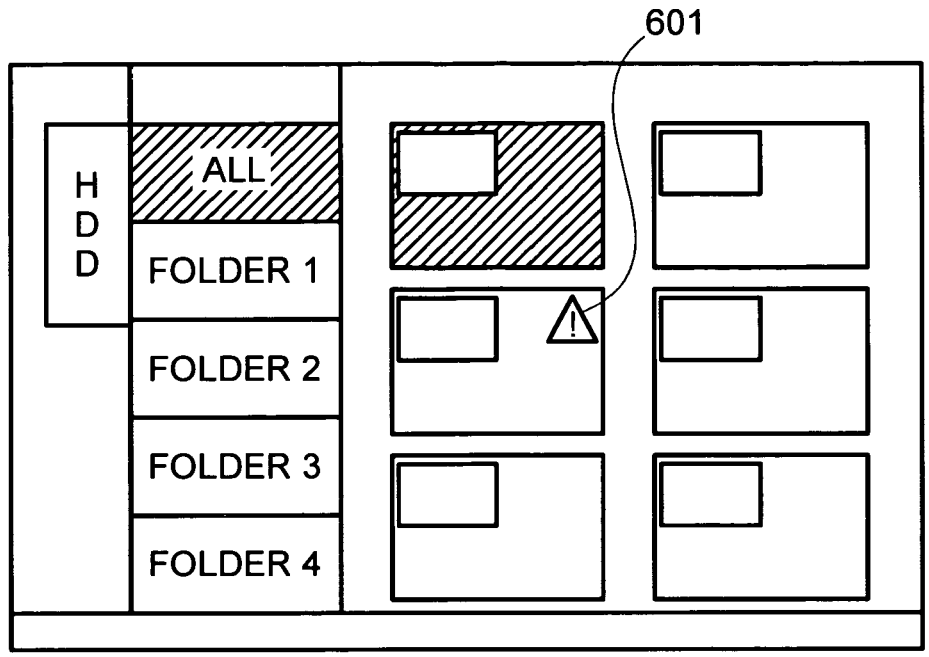
FIG. 6 is a diagram illustrating a warning screen displayed when a piece of SI is missing.
Figure 7:
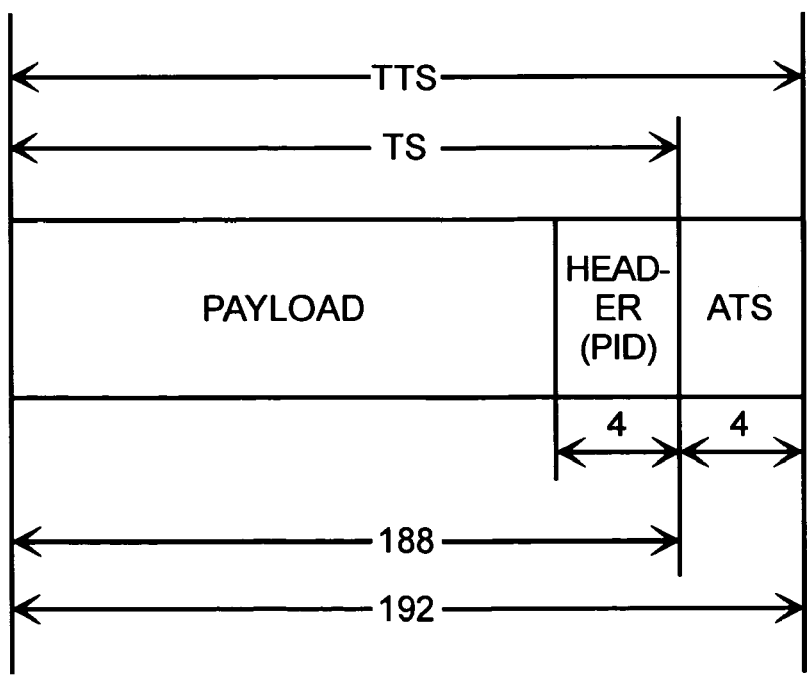
FIG. 7 is a schematic diagram illustrating an example of a TTS packet.
Figure 8:
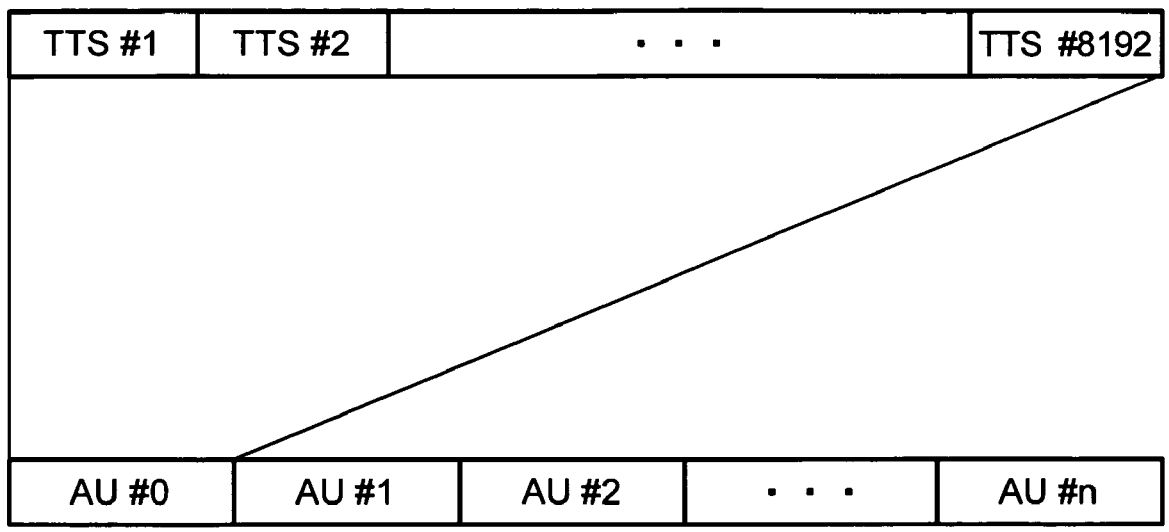
FIG. 8 is a schematic diagram illustrating the relationship between TTS packets and AUs in an AV stream recorded on a recording medium.

FIG. 6 is a diagram illustrating a warning screen displayed when a piece of SI is missing.

Figure 9:
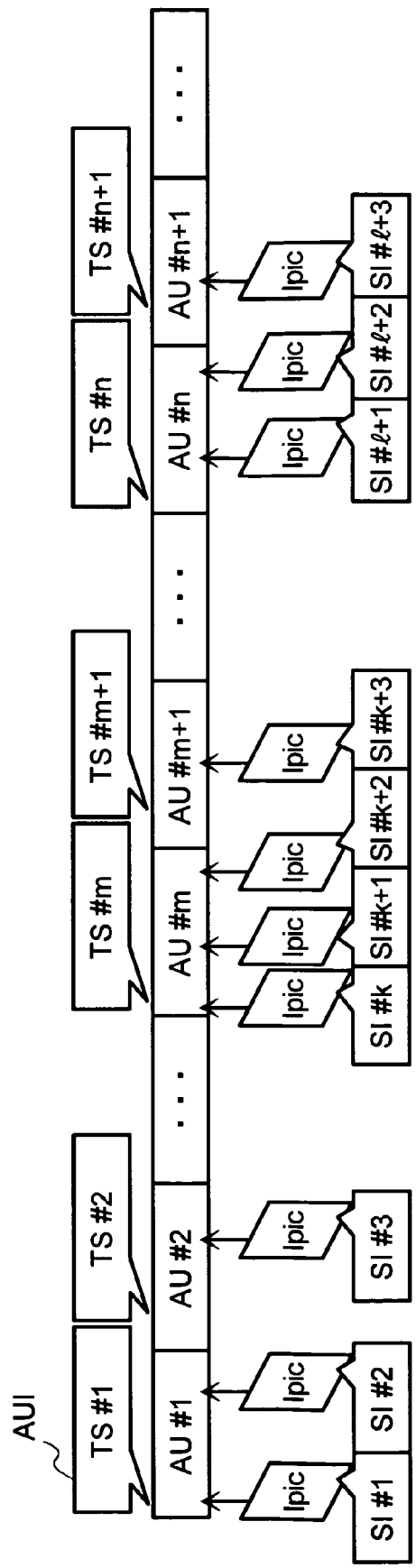
FIG. 9 is a schematic diagram illustrating the relationship among AUs, I pictures, and accompanying information thereof, which are included in an AV stream recorded on a recording medium.

When the special reproduction involved in fast forwarding or fast rewinding is performed with only an I picture displayed, the location of an I picture written onto a recording medium is kept track of on the basis of SI or AUI so that a desired I picture is read out. In the case of SI, a time stamp is written on a GOP basis or on an I picture basis. Therefore, for example, if information is sequentially read out, it is possible to keep track of the most proper location. In the case of AUI, as shown in FIG. 9, one AU may include a plurality of I pictures. Therefore, in order to read out a desired I picture, it is necessary to perform sequential reading starting from data indicated by the top of a target AU so that the desired I picture is searched for.

According to the present invention, as shown in FIG. 3, while the special reproduction such as fast forwarding is performed, a portion where SI is missing is subjected to the special reproduction with reference to AUI. To be more specific, while the special reproduction such as fast forwarding is performed, the control unit 114 judges whether or not a piece of SI is missing. If it is judged that a piece of SI is missing, the special reproduction is performed with reference to a time stamp of AUI.

The actual processing is performed as follows. The control unit 114 shown in FIG. 1 gives an instruction to the read control unit 202 to read ahead SI. If a time stamp recorded in the SI on a search access basis indicates a skip whose value is greater than or equal to a specified value, it is judged that a piece of SI is missing. Accordingly, a packet is searched for from a time stamp of AUI to determine an I picture that is to be used for the special reproduction. Because SI and AUI are written as different files from video data, it is possible to easily read out information ahead of data that is being read.

As processing at the time of the special reproduction, as shown in FIG. 4, SI is read ahead to judge whether or not SI exists (S401). In the case of SI, because the number of time stamps recorded for one GOP is one, it can be predicted that the difference between time stamps in an ordinary broadcast stream is, for example, about 0.5 seconds. Therefore, a certain threshold value is provided beforehand, and time stamp information is reviewed one by one. If the difference between a time stamp and the immediately preceding time stamp exceeds the threshold value, it is judged that SI is missing at that region exceeding the threshold value.

If it is judged that SI exists, the special reproduction processing is performed with reference to the SI (S402).

If it is judged that SI does not exist, a judgment is made as to whether or not AUI exists (S403). In the case of AUI, one time stamp is recorded for a specified amount of data. To be more specific, the interval between time stamps varies according to a data rate of a recorded broadcast program. Because a data rate is known beforehand at the time of recording, a threshold value is set according to the data rate. As is the case with the judgment as to whether or not SI exists, the absence of AUI pieces is judged from the difference between time stamps.

If it is judged that AUI exists, the special reproduction processing is performed with reference to the AUI (S404).

If it is judged that AUI does not exist, error processing is performed (for example, an error message is issued, and the reproduction processing is finished) (S405).

If SI exists, or if AUI exists, the processing is continued until the end of the broadcast program (S406).

The amount of information to be read ahead depends on how the apparatus is implemented. However, the amount of information to be read ahead may be properly changed according to the speed of fast forwarding/rewinding. In addition, for example, it is also possible to read all SI and all AUI at the time of starting the reproduction of contents.

As an example of the error processing in the step S405, as shown in FIG. 5, data is output from the last AUI that has been detected (S501); because it is not possible to perform the special reproduction, the control unit 111 instructs the recording and reproducing unit to switch to a normal reproducing mode (S502).

Then, a series of data (for example, one AU) is output up to the end of the data (S503). For example, after the operation is switched so that the normal reproduction is performed up to the end of a broadcast program, if a user gives an instruction to perform the special reproduction, it is also supposed that the processing shown in FIG. 4 is restarted again.

As a result of the detection of the absence of SI pieces (S401), when the special reproduction processing is performed on the basis of AUI (S403), it is possible to perform the special reproduction. However, as compared with the special reproduction performed on the basis of SI, it is not possible to expect perfect special reproduction as viewed by a user. For example, when the speed of fast forwarding is high, a drawback is involved that the reproduction is not smooth. Accordingly, as shown in FIG. 6, if a screen displaying a list of broadcast programs includes a problematic broadcast program, a warning mark 601 may be displayed to notify the user that a missing piece of SI might affect the special reproduction.

In the above description, while the special reproduction is performed by use of SI, if the absence of SI pieces is detected, the special processing is performed by use of AUI as a substitution for the SI. Similarly, if the absence of SI pieces is detected when a broadcast program is provided with chapters, or if it is detected when broadcast-program division processing is performed, such processing may also be performed by use of AUI.

As described above, according to the present invention, it is possible to provide a reproducing apparatus that is capable of more satisfactorily performing the special reproduction. To be more specific, it is possible to provide an image reproducing apparatus that is capable of, during the reproduction of a digital broadcast based on the MPEG standard, continuously performing the special reproduction even if it becomes impossible to use SI.

What is claimed is:

1. An image reproducing apparatus for receiving contents information, said contents information being transmitted with a plurality of pieces of packeted information that is beforehand specified included, said image reproducing apparatus comprising:
a recording medium on which the contents information is recorded, said contents information including a stream and stream management information used to manage the stream;
a recording and reproducing unit for reproducing the stream recorded on the recording medium; and
a control unit for instructing the recording and reproducing unit to read the stream recorded on the recording medium;
said stream management information includes information used to manage an access unit at the time of reproduction and information used to manage an unit area of the stream; and
when the recording and reproducing unit performs the special reproduction of the stream the control unit makes a judgment as to whether or not the stream management information includes a piece of the information used to manage an access unit at the time of reproduction, and
when it is judged that the stream management information includes a piece of the information used to manage an access unit at the time of reproduction, the control unit determines a read position of the recorded stream on the basis of the information used to manage an access unit at the time of reproduction and then instructs the recording and reproducing unit to performs the special reproduction of the stream, and
when it is judged that the stream management information does not include a piece of the information used to manage an access unit at the time of reproduction and includes information to manage a unit area of the stream, the control unit determines a read position of the recorded stream on the basis of the information used to manage an unit area of the stream and then instructs the recording and reproducing unit to performs the special reproduction of the stream.

2. The image reproducing apparatus according to claim 1, wherein:
said judgment as to whether or not the stream management information includes a piece of the information used to manage an access unit at the time of reproduction is made by a time stamp that is added to the access unit at the time of reproduction.

3. The image reproducing apparatus according to claim 1, further comprising a display unit, wherein:
when it is judged that the stream management information about contents does not include a piece of the information used to manage an access unit at the time of reproduction a warning message for the contents information of the contents is displayed on the display unit.

4. A special reproduction method for an image reproducing apparatus for receiving contents information, said contents information being transmitted with a plurality of pieces of packeted information that is beforehand specified included, said image reproducing apparatus includes:
a recording medium on which the contents information is recorded, said contents information including a stream and stream management information used to manage the stream;

a recording and reproducing unit for reproducing the stream recorded on the recording medium; and a control unit for instructing the recording and reproducing unit to read the stream recorded on the recording medium, said stream management information includes information used to manage an access unit at the time of reproduction and information used to manage an unit area of the stream and said special reproduction method comprising the steps of:

when the recording and reproducing unit performs the special reproduction of the stream the control unit making a judgment as to whether or not the stream management information includes a piece of the information used to manage an access unit at the time of reproduction;

when it is judged that the stream management information includes a piece of the information used to manage an access unit at the time of reproduction, the control unit determining a read position of the recorded stream on the basis of the information used to manage an access unit at the time of reproduction and then the control unit instructing the recording and reproducing unit to perform the special reproduction of the stream; and when it is judged that the stream management information does not include a piece of the information used to manage an access unit at the time of reproduction and includes a piece of the information used to manage a unit area of the stream, the control unit determining a read position of the recorded stream on the basis of the information used to manage an unit area of the stream and then the control unit instructing the recording and reproducing unit to perform the special reproduction of the stream.

5. The special reproduction method for the image reproducing apparatus according to claim 4, wherein:

the access unit at the time of reproduction includes at least an I picture of one MPEG.

\* \* \* \* \*